United States Patent
He et al.

(10) Patent No.: US 8,316,011 B2
(45) Date of Patent: Nov. 20, 2012

(54) NON-PARAMETRIC MEASUREMENT OF MEDIA FINGERPRINT WEAK BITS

(75) Inventors: Junfeng He, New York, NY (US); Regunathan Radhakrishnan, San Bruno, CA (US); Wenyu Jiang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 34 days.

(21) Appl. No.: 13/173,462

(22) Filed: Jun. 30, 2011

(65) Prior Publication Data

US 2012/0011128 A1  Jan. 12, 2012

Related U.S. Application Data

(60) Provisional application No. 61/362,503, filed on Jul. 8, 2010.

(51) Int. Cl.
*G06F 7/00* (2006.01)
*G06F 17/30* (2006.01)
(52) U.S. Cl. .................... 707/713; 707/747; 707/759
(58) Field of Classification Search .................. 707/713, 707/747, 759
See application file for complete search history.

(56) References Cited

U.S. PATENT DOCUMENTS

2003/0016823 A1\* 1/2003 Chung .......................... 380/46
2010/0306193 A1\* 12/2010 Pereira et al. ................. 707/728
2011/0142348 A1   6/2011 Radhakrishnan

OTHER PUBLICATIONS

"Optimal configuration of hash table based multimedia fingerprint databases using weak bits"; Claus Bauer, Regunathan Radhakrishnan, and Wenyu Jiang; Dolby laboratories, San Franciscon—CA; 2010.\*

\* cited by examiner

*Primary Examiner* — Giovanna Colan
(74) *Attorney, Agent, or Firm* — Lawrence Goerke

(57) ABSTRACT

A value is computed for a feature in an instance of query content and compared to a threshold value. Based on the comparison, first and second bits in a hash value, which is derived from the query content feature, are determined. Conditional probability values are computed for the likelihood that quantized values of the first and the second bits equal corresponding quantized bit values of a target or reference feature value. The conditional probabilities are compared and a relative strength determined for the first and second bits, which directly corresponds to the conditional probability. The bit with the lowest bit strength is selected as the weakbit. The value of the weakbit is toggled to generate a variation of the query hash value. The query may be extended using the query hash value variation.

26 Claims, 6 Drawing Sheets

Example Feature Comaprison 100

Example Buckets and Thresholds 300 for deriving 2 bits from feature $Z_k$

NON-PARAMETRIC MEASUREMENT OF MEDIA FINGERPRINT WEAK BITS

RELATED U.S. APPLICATION & PRIORITY CLAIM

This Application claims the benefit of priority to related, Provisional U.S. Patent Application No. 61/362,503 filed on 8 Jul. 2010 entitled 'Non-parametric Measurement of Media Fingerprint Weak Bits' by Junfeng He, et al. with, which is assigned to Dolby Laboratories Licensing Corporation.

TECHNOLOGY

Embodiments of the present invention relate generally to hash based fuzzy matching processes, such as for searching a media fingerprints database. An embodiment of the present invention, more particularly, relates to non-parametrically computing weakbits in a media fingerprint codeword.

BACKGROUND

Media fingerprints are compact and unique bit stream identifiers that are derived from, or comprise components that may be extracted from, underlying media content. Media fingerprints are robust to modifications on content such as transcoding, geometric distortion, and various attacks. Media fingerprints can be efficiently stored in a database and searched to enable content identification applications. Example applications of media fingerprinting technology includes the detection of copyrighted material streaming in the internet, broadcast monitoring, retrieval of enhancement metadata during content playback, synchronizing audio and video portions of multimedia content, and metadata propagation in broadcast studios.

Media fingerprinting systems typically function with a database of reference fingerprints, which are extracted from a set of reference media content. Queries may thus be conducted over a fingerprint database to identify an instance of media content. In this context, the media instance to be identified may be referred to herein as "query content." When query content that is to be identified is presented to the fingerprint system, the system extracts (e.g., derives, computes, samples components) from the query content and matches the extracted fingerprints against the reference fingerprints that are stored in the database.

Media fingerprinting systems typically function with a database of fingerprints, which are extracted from a set of reference media content. The fingerprint database may be queried upon a situation in which an instance of media content is to be identified. The media content that undergoes identification may be referred to herein as "query content." Upon presentation of query content to the fingerprint system for identification or another utility, query content, fingerprint systems function to derive (e.g., compute, extract) fingerprints from components of the query content. The fingerprints that are extracted from the query content are matched against the reference fingerprints, which are stored in the database.

Hash values generally represent any number or set of numbers that are computed using a well-defined procedure or mathematical function (which may be referred to as a hash function) that is applied to possibly larger or variable-sized data. Hash values may be used for indexing content (e.g., storing and querying content based on hash values). For example, a hash value used for indexing a fingerprint (or sub-fingerprint) of media content may be derived based on one or more features in the media content. Hash values used for indexing a fingerprint may be referred to as fingerprint codewords. Furthermore, fingerprints themselves may be used as hash values for indexing data. The terms hash values, fingerprint codewords, or fingerprints may be used interchangeably herein.

Matching the query fingerprint with the stored reference fingerprints returns an identity in relation to the query fingerprint, e.g., based on its similarity with a corresponding reference fingerprint. Hash based lookups are typically used to match stored reference content with query content. However, noise and attacks, which modify the query content in relation to the reference content can reduce both the re-call rate (e.g., accuracy) and increase search times that relate to the fingerprint queries The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
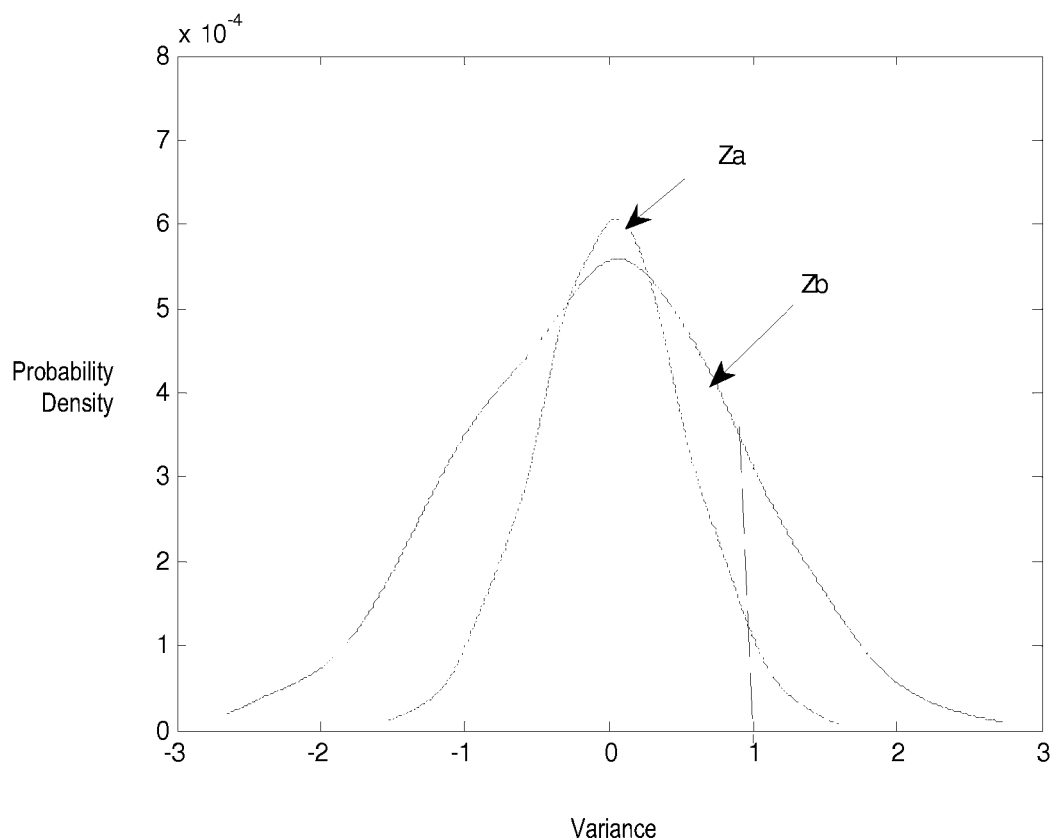
FIG. 1 depicts an example effect of variance of the feature on weakbit prediction.

Hash based fuzzy matching processes, such as for searching a media fingerprints database, are described herein. An embodiment of the present invention relates to non-parametrically computing weakbits in a media fingerprint codeword. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

A value is computed for a feature in an instance of query content and compared to a threshold value. Based on the comparison, first and second bits in a hash value, which is derived from the query content feature, are determined. Conditional probability values are computed for the likelihood that quantized values of the first and the second bits equal a quantized bit value of a target or reference feature value. The conditional probabilities are compared and a relative strength determined for the first and second bits, which directly corresponds to the conditional probability. The bit with the lowest bit strength is selected as the weakbit. The value of the weakbit is toggled to generate a variation of the query hash value. The query may be extended using the query hash value variation.

Embodiments of the present invention relate to hash based fuzzy matching processes, such as for searching a media fingerprints database. An embodiment of the present invention relates to non-parametrically computing weakbits in a media fingerprint codeword. An embodiment improves the accuracy (e.g., recall rate) of a hash based look-up high dimensional process, such as matching media fingerprints in a database. Fingerprint matching is used herein to describe an example application of an embodiment. However, it should be appreciated that embodiments of the present invention are well suited to function with any hash based fuzzy matching process. While media fingerprints are used herein for unity, brevity and simplicity of description, example embodiment should be understood to function with any hash based fuzzy data matching process. An embodiment may compute any high-dimensional data look-up based on fuzzy hashing.

For example, a database may comprise a set of items wherein each item is represented by a high-dimensional feature vector. Video, image, audio and/or speech content may comprise examples of such items, e.g., data that are represented in the database as high dimensional feature vectors. Each of the high-dimensional feature vectors is indexed in the database with a hash codeword.

An embodiment computes a query over the database, given a query feature vector in the high dimensional space, and uses a hash based fuzzy matching process to search the database. A match is found if the query feature vector is in the neighborhood of, e.g., approximates, a matching (e.g., target) feature vector in the database. In an embodiment, query feature vectors may return a matching feature vector, which differs in one or more respects. For example, the matching feature vector returned upon computing a query feature vector over the database may not be an exact match. In a sense, an "approximately matching" feature vector may be returned, upon computing a query feature vector.

An embodiment functions with a fuzzy matching process to consider certain bits of the query hash codeword to be weak, e.g., likely to be changed. The weak bits are flipped, e.g., toggled to their complimentary binary value. The flipped bits are used to perform multiple hash look-ups, e.g., subsequent to a first or a single look-up for an exact match. An embodiment predicts a subset of bits, e.g., out of all the bits in a query hash codeword, to be flipped during the fuzzy matching process.

An embodiment predicts weak bits ("weakbits") in a hash codeword based on the effect of noise on features of underlying media content or other data. As used herein, the term "weakbits" may relate to a subset of bits, out of all the bits in the hash codeword, that is most likely to change, e.g., due to content modifications. Content modifications may include transcoding, off-speed playout, and/or geometric attacks such as rotation. An embodiment captures the effect of noise in a cumulative distribution function (cdf) of the change in projected feature values due to content modifications using an offline training set, e.g., of reference instances of media data.

An embodiment measures the weakness of a hash codeword bit, e.g., the bit's likelihood of changing, based on a conditional probability. As used herein, the terms conditional probability or conditional probability value may relate to a measure, given an observed feature value, of how likely the quantization of the observed feature value is to equal (or closely approximate) a corresponding quantized original feature value, e.g., from a corresponding instance of the reference content.

An example fingerprint codeword has a length W of bits. Upon initiating a fingerprint database creation, each fingerprint codeword is indexed therein using a hash-table with $2^W$ entries. To identify a portion of query media content, e.g., at playout time or upload time of the content portion, fingerprints are extracted from the query content portion and a search computed therewith over the database. A hash look-up operation may be performed on each query fingerprint codeword.

A media fingerprint has a property of robustness. Robustness relates to how similar a query fingerprint is to a reference fingerprint, which is extracted from corresponding reference content (e.g., reference content to which the modified or query content corresponds).

For example, a fingerprint's robustness allows a match to be computed from the fingerprint of query media content, which is similar to the reference content that is stored in the database, but perhaps modified in some way and thus, a different content instances therefrom (e.g., not exactly the same content). Thus, a simple hash-lookup for an exact match of the codeword might possibly miss detecting a correct match in the database.

An embodiment performs more than a single hash look-up during search. For example, a set of bits selected out of the W bits in the query fingerprint codeword are marked as weakbits. The weakbits are those of the W total bits in the codeword that are most likely to have changed, e.g., due to noise and/or modifications on the content. For a number S of weakbits, $2^S$ hash look-ups are performed, e.g., computing the query hash value with all combinations of the weakbits. An embodiment determines the weakest S bits in a W bit fingerprint codeword, and thus increases the probability that a true match is computed, without a significant increase in search latency.

Feature Variance and Content Modification Effects

Typically, media fingerprints are extracted from an underlying portion of media content based on quantization of a set of robust features that comprise components of, and which may be derived or sampled from the media content. A set of robust features may be represented as $Z_1, Z_2, \ldots Z_M$. For a quantization step that derives 1-bit from each feature $Z_j$ (where j runs from 1–M) using a corresponding quantization threshold $th_j$, the number of bits in a fingerprint of W bits is equal to the number of features M (W=M).

A first approach in which a number S of the weakest bits is derived out of the W bits in the fingerprint codeword computes an absolute difference $D_j$ between each feature $Z_j$ and a threshold value $th_j$: $D_j=abs(Z_j-th_j)$. The difference $D_j$ measures how close the feature ($Z_j$) is to the thresholding boundary ($th_j$). The S bits that correspond to the smallest S differences $D_j$ are determined to be the S weakest bits, e.g., the bits likely to change due to a modification on the content. However, the approach considers neither the variance of the features $Z_j$, nor and the effect of content modifications on the feature.

FIG. 1 depicts an example effect of variance of the feature on weakbit prediction. The effect of variance of the feature on weakbit prediction is shown with probability density functions (pdfs) of two example features Za and Zb. The feature Zb has a larger variance than Za. Given the same observed feature value, e.g., "1" for these two features and the same robustness measurement (e.g., equal signal-to-noise ratios), the bit derived from Zb is more likely to change than the bit derived from Za. However, the first approach does not account for possible unequal variances of the features, given the same robustness.

Figure 2A:
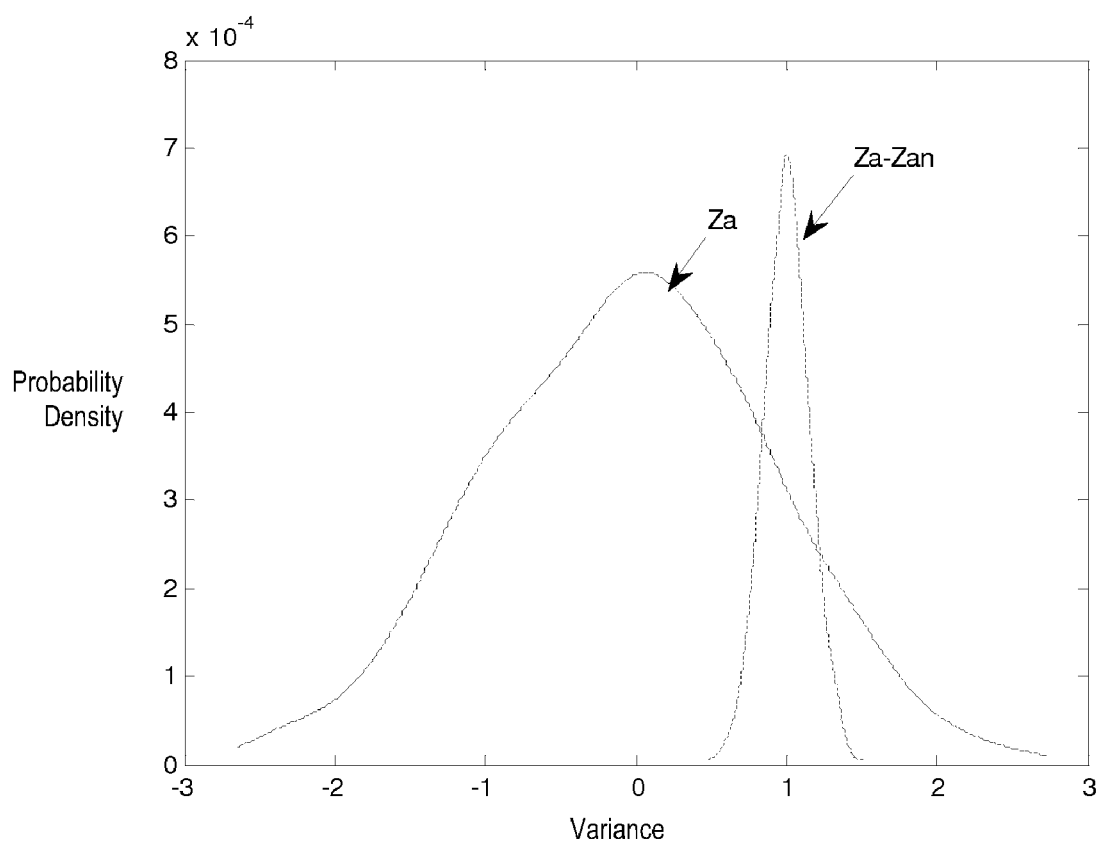
FIG. 2A and FIG. 2B depict example effects of content modifications on weakbit prediction.
Figure 2B:
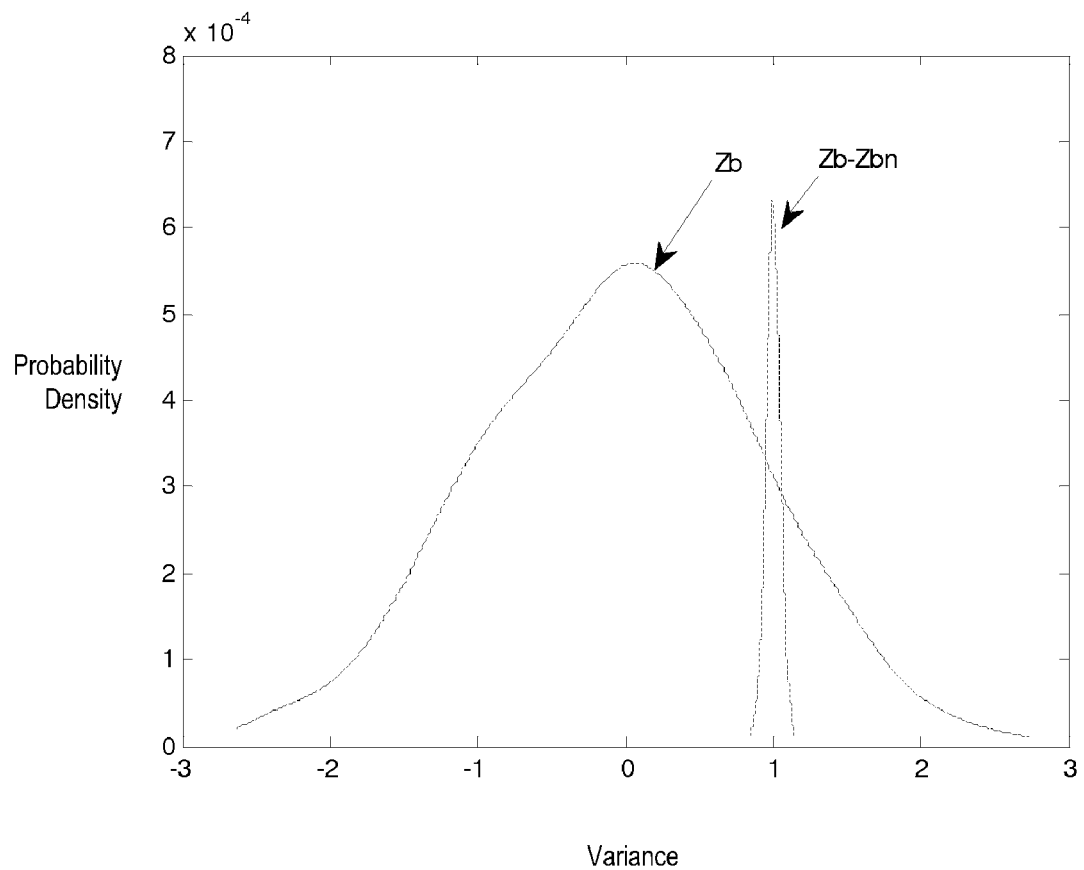

FIG. 2A and FIG. 2B depict example effects of content modifications on weakbit prediction. In FIG. 2A, the pdf of the feature Za and the conditional pdf of the noise (Za−Zan) is shown for a given value of 1 for the feature Za: Za=1. Zan represents the value of the feature that is derived from a modified instance of the underlying media content. In FIG. 2B, the pdf of the feature Zb and the conditional pdf of noise (Zb−Zbn) is shown for a given value of 1 for the feature Zb: Zb=1. Za and Zb are features that have similar variances. However, content modifications affect the two features differently. For example, the feature Za is more affected by content modifications than the feature Zb. Thus, the variance of (Za−Zan) is larger than the variance of (Zb−Zbn). Given the same observed value for these two features, a bit derived from Za is more likely to change than a bit derived from Zb. The first approach further does not account for such unequal noise variances of the features. The first approach essentially may consider distance to a closest thresholding boundary, uses only a single bit on each projection k, computes a cumulative distribution function that is the same for every projection k, and treats noise as independent of the modified content instance.

An embodiment of the present invention functions to consider the variance of the features, as well as the effect of content modifications on the features in determining the S weakest bits. An embodiment functions independent of assumptions related to the type of pdf (e.g., Gaussian, Laplacian, etc.) for the features or noise. Moreover, an embodiment functions for any number of bits derived from quantizing a feature value.

Example Weakbits Embodiment

An example embodiment extracts $Z_1, Z_2, \ldots Z_M$ features from an instance of original or reference media content. Corresponding features $\overline{Z_1}, \overline{Z_2}, \ldots \overline{Z_M}$ are derived from a modified instance of the content, such as a content instance that has been modified in relation to the reference content instance. A number $w_k$ of bits are derived from each feature $Z_k$. Thus, the number W of bits per codeword is given by Equation 1, below.

$$W = \sum_{k=1}^{M} w_k \tag{1}$$

The number $w_k$ bits derived from feature $Z_k$, are extracted from $2^{w_k}$ buckets. Thus, an embodiment functions with $2^{w_k}+1$ thresholds (including $-\infty$ and $+\infty$). The thresholds are represented herein with $th_j$, $j=1, 2, \ldots 2^{w_k}+1$.

Figure 3:
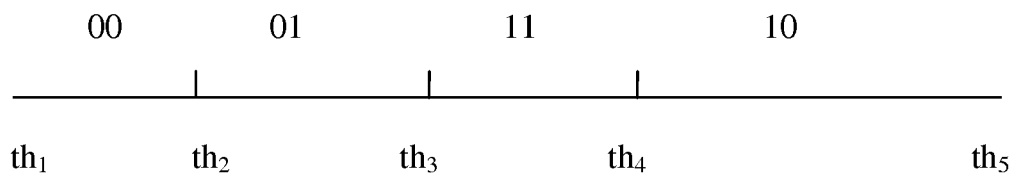
FIG. 3 depicts example buckets and thresholds 300 for deriving 2 bits from a feature, according to an embodiment of the present invention.

FIG. 3 depicts example buckets and thresholds 300 for deriving 2 bits from feature $Z_k$, according to an embodiment of the present invention. Noise due to content modifications may be represented as: $Z_k - \overline{Z}_k$ as $E_k$. Query media content is assumed to be a modified instance (e.g., version) of an original content instance, such as reference content. For an example query media content x, the observed feature value for $\overline{Z}_k$ comprises $x_k$; the quantization of $x_k$ comprises $b_1 \ldots b_{w_k}$. For a bit $k_i$, wherein $1 \leq k_i \leq w_k$, the corresponding quantization function $Q_{k_i}$ may be represented according to Definitions 2, below.

$$Q_{k_1}(z) = \begin{cases} 1, & \text{if } th_3 < z < th_5 \\ 0, & \text{if } th_1 < z < th_3, \end{cases} \tag{2}$$

$$Q_{k_2}(z) = \begin{cases} 1, & \text{if } th_2 < z < th_4 \\ 0, & \text{if } th_1 < z < th_2 \text{ or } th_4 < z < th_5. \end{cases}$$

Thus, the conditional probability: $q_{k_i} = P(Q_{k_i}(Z_k) = Q_{k_i}(\overline{Z}_k) | \overline{Z}_k = X_k)$ comprises a measure of the probability that the original fingerprint bit (bit $k_i$) that is derived from reference content $Z_k$ is same as the bit correspondingly derived from the modified content $\overline{Z}_k$. The larger the probability that the original fingerprint bit (bit $k_i$) that is derived from reference content $Z_k$ is same as the bit correspondingly derived from the modified content $\overline{Z}_k$, the less likely it is for this bit to flip (e.g., that this bit may flip) due to content modifications. An embodiment computes $q_{k_i}$ for all k and i, and sorts the computed results in ascending order. An embodiment considers the first S bits sorted (e.g., the lower values of the computed results) to comprise the weakest S bits out of the W bits that are derived from content $x_k$.

An embodiment computes the conditional probability $q_{k_i}$ according to Equation (3), below.

$$\begin{aligned} q_{k_i} &= P(Q_{k_i}(Z_k) = Q_{k_i}(\overline{Z}_k) | \overline{Z}_k = x_k) \\ &= \frac{P(Q_{k_i}(Z_k) = Q_{k_i}(\overline{Z}_k), \overline{Z}_k = x_k)}{P(\overline{Z}_k = x_k)} \\ &= \frac{P(Q_{k_i}(Z_k) = b_{k_i}, \overline{Z}_k = x_k)}{P(\overline{Z}_k = x_k)} \\ &= \frac{P((th_{l1} \leq Z_k \leq th_{r1}, \ldots th_{li} \leq Z_k \leq th_{ri}, \ldots, th_{lc} \leq Z_k \leq th_{rc}), \overline{Z}_k = x_k)}{P(\overline{Z}_k = x_k)} \end{aligned} \tag{3}$$

In Equation 3, $th_{li}$ and $th_{ri}$ represent thresholds that correspond to a quantization function $Q_{k_i}(\ ) b_{k_i}$.

For the example buckets and thresholds 300 depicted in FIG. 3, the quantization thresholds for $b_{k_2}=0$ comprise: $th_1 \leq Z_k \leq th_2$ or $th_4 \leq Z_k \leq th_5$. The conditional probability is thus computed according to Equation 4, below.

$$\begin{aligned} q_{k_i} &= \frac{P((th_{l1} - x_k \leq Z_k - \overline{Z}_k \leq th_{r1} - x_k, \ldots, th_{lc} - x_k \leq Z_k - \overline{Z}_k \leq th_{rc} - x_k), \overline{Z}_k = x_k)}{P(\overline{Z}_k = x_k)} \\ &= \frac{P((th_{l1} - x_k \leq E_k \leq th_{r1} - x_k, \ldots, th_{lc} - x_k \leq E_k \leq th_{rc} - x_k), \overline{Z}_k = x_k)}{P(\overline{Z}_k = x_k)} \\ &= \frac{F_k(th_{r1} - x_k, x_k) - F_k(th_{l1} - x_k, x_k) + \ldots + F_k(th_{rc} - x_k, x_k) - F_k(th_{lc} - x_k, x_k)}{P(\overline{Z}_k = x_k)} \end{aligned} \tag{4}$$

In Equation 4, $F_k$ represents the joint cumulative distribution function (c.d.f.) for $(E_k, \overline{Z}_k)$. An embodiment computes the c.d.f. using a off-line training data. The off-line training set comprises features $Z_k$ and $\overline{Z}_k$, which are respectively computed from examples of original (e.g., reference) content and modified content. Noise $E_k$ may be considered to be independent of the modified content $\overline{Z}_k$, which can simplify computation of conditional probability. For example, where noise is independent of the modified content, an embodiment computes the conditional probability according to Equation 5, below.

$$q_{k_i} = \frac{P(th_{l1} - x_k \leq E_k \leq th_{r1} - x_k, \ldots, th_{lc} - x_k \leq E_k \leq th_{rc} - x_k)P(\overline{Z}_k = x_k)}{P(\overline{Z}_k = x_k)}$$
$$= P(th_{l1} - x_k \leq E_k \leq th_{r1} - x_k, \ldots, th_{lc} - x_k \leq E_k \leq th_{rc} - x_k))$$
$$= F_{E_k}(th_{r1} - x_k) - F_{E_k}(th_{l1} - x_k) + \ldots +$$
$$F_{E_k}(th_{rc} - x_k) - F_{E_k}(th_{lc} - x_k)$$
(5)

In Equation 5, $F_{E_k}$ represents the c.d.f. of the noise $E_k$. An embodiment obtains the c.d.f. $F_{E_k}$ from an off-line training dataset, which comprises the original/reference content features $Z_k$ and the modified content instance features $\overline{Z}_k$.

In an embodiment, information that relates to feature variances is captured, e.g., non-parametrically, in the form of the threshold boundaries $(th_j)$. Information about the effect of content modification on each feature $Z_k$ is captured in the joint c.d.f $F_k$ or the noise related c.d.f $F_{E_k}$. An embodiment functions independently of the type of pdf for the features $Z_k$, $\overline{Z}_k$, or for the noise $E_k$.

Example Weakbit Computation:

Noise not Independent of Modified Content

An embodiment computes the weakbits without noise being independent of the modified content. A robustness characteristic of the feature value $\overline{Z}_k$ is represented with a joint c.d.f. $F_k$. The joint c.d.f. $F_k$ is computed for $(E_k, \overline{Z}_k)$, e.g., from one or more off-line training data sets. In view of the computed c.d.f., a given query x, its projected value $x_k$ and bits $b_1 \ldots b_{w_k}$ are computed on a projection k. Additionally or alternatively, an embodiment may derive a feature independently of a projection, or using a projection to derive a feature, along with another derivation technique. The number W of bits per codeword is computed according to Equation 1.

$$W = \sum_{k=1}^{M} w_k \quad (1)$$

A number S of the W bits comprises weakbits, which are more likely to flip in fingerprints extracted from modified content instances.

For every $k_i$, $1 \leq k_i \leq w_k$, of every projection k, an embodiment obtains threshold constraints $th_{l1} \leq z \leq th_{r1}, \ldots$ $th_{li} \leq z \leq th_{ri}, \ldots, th_{lc} \leq z \leq th_{rc}$, which correspond to the quantization function $Q_{k_i}() = b_{k_i}$ An embodiment computes the conditional probability according to Equation 3.

$$q_{k_i} = \frac{F_k(th_{r1} - x_k, x_k) - F_k(th_{l1} - x_k, x_k) + \ldots +}{P(\overline{Z}_k = x_k)} \quad (4)$$

The computed conditional probabilities $q_{k_i}$ are sorted all in ascending order. The first S bits, e.g., the bits with the lowest values upon the sorting, are thus determined to be the weakest S bits out of W bits. An embodiment may flip the weakbits, conduct or extend queries using the weakbits, and thus reduce search latency.

Additionally or alternatively, upon comparing the feature value to the threshold value and determining whether the feature value exceeds the threshold value, the bit strength may be determined based on a computed distribution. For example, a measurement of the robustness characteristic may be applied to the feature value based on the feature in the query content. The robustness characteristic may comprise a conditional p.d.f. for each observed feature value, e.g., obtained from an off-line training set. The computed distribution is associated with the feature value, in which a first portion of the computed distribution is less than the threshold value and a second portion of the computed distribution is greater than the threshold value. Then, the bit strength is determined as the portion of the computed distribution that is greater than the threshold. Moreover, upon comparing the feature value to the threshold value and determining that the feature value is less than the threshold value, the bit strength may be determined based on a computed distribution. A measurement of the robustness characteristic is applied to the feature value based on the feature in the query content. The computed distribution is associated with the feature value, in which a first portion of the computed distribution is less than the threshold value and a second portion of the computed distribution is greater than the threshold value. Then, the bit strength is determined as the portion of the computed distribution that is less than the threshold. This approach may be used with Weakbit computations in which noise is independent of modified content.

Example Weakbit Computation: Noise Independent of Modified Content

An embodiment computes the weakbits with noise being independent of the modified content. A robustness characteristic of the feature value $\overline{Z}_k$ is represented with a c.d.f. $F_{Ek}$. The c.d.f. '$F_{Ek}$' is computed for $E_k$, e.g., from one or more off-line training data sets. In view of the computed c.d.f., a given query x, its projected value $x_k$ and bits $b_1 \ldots b_{w_k}$ are computed on a projection k. The number W of bits per codeword is computed according to Equation 1.

$$W = \sum_{k=1}^{M} w_k \quad (1)$$

A number S of the W bits comprises weakbits, which are more likely to flip in fingerprints extracted from modified content instances.

For every $k_i$, $1 \leq k_i \leq w_k$, of every projection k, an embodiment obtains threshold constraints $th_{l1} \leq z \leq th_{r1}, \ldots, th_{li} \leq z \leq th_{ri}, \ldots, th_{lc} \leq z \leq th_{rc}$, which correspond to the quantization function $Q_{k_i}(\ ) = b_{k_i}$. An embodiment computes the conditional probability according to Equation 5.

$$q_{k_i} = F_{E_k}(th_{r1} - x_k) - F_{E_k}(th_{l1} - x_k) + \ldots + F_{E_k}(th_{rc} - x_k) - F_{E_k}(th_{lc} - x_k) \quad (5)$$

A robustness characteristic of the feature value $Z_k$ is represented with the c.d.f., $F_{Ek}$ in Equation 5.

The computed conditional probabilities $q_{k_i}$ are sorted all in ascending order. The first S bits, e.g., the bits with the lowest values upon the sorting, are thus determined to be the weakest S bits out of W bits. An embodiment may flip the weakbits, conduct or extend queries using the weakbits, and thus reduce search latency.

Upon comparing the feature value to the threshold value and determining whether the feature value exceeds the threshold value, the bit strength may be determined based on a computed distribution. For example, a measurement of the robustness characteristic may be applied to the feature value based on the feature in the query content. The robustness characteristic may comprise a non-conditional p.d.f., which is independent of each observed feature value, e.g., obtained from an off-line training set. The computed distribution is associated with the feature value, in which a first portion of the computed distribution is less than the threshold value and a second portion of the computed distribution is greater than the threshold value. Additionally or alternatively, upon comparing the feature value to the threshold value and determining that the feature value is less than the threshold value, the bit strength may be determined based on a computed distribution. A measurement of the robustness characteristic is applied to the feature value based on the feature in the query content. The computed distribution is associated with the feature value, in which the bit strength is determined as that, which is directly proportional to a portion of the computed distribution that is less than the threshold.

Example Computer System Implementation Platform

Figure 4:
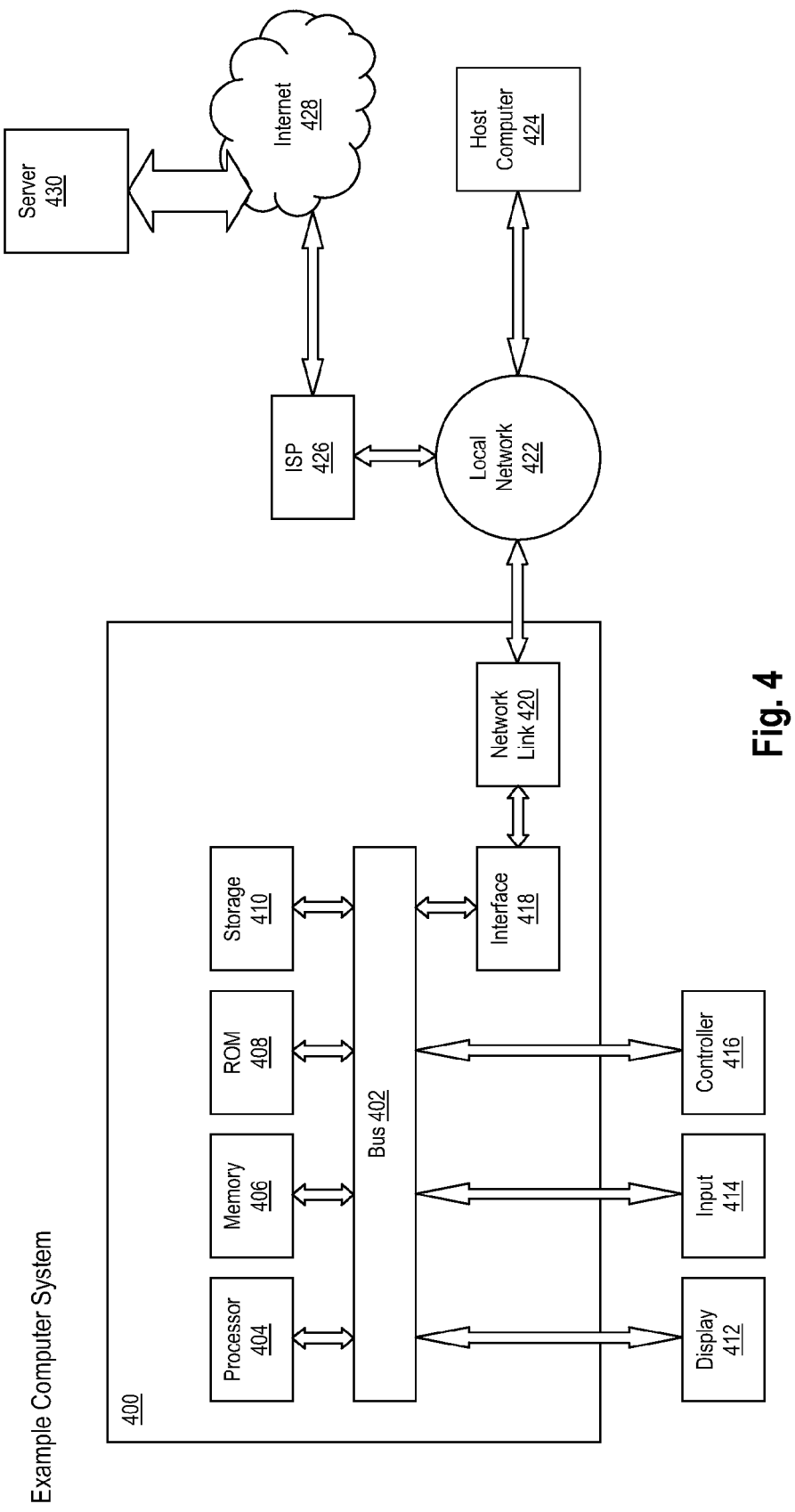
FIG. 4 depicts an example computer system platform, an example IC platform, with which embodiments of the invention may be implemented.

Embodiments of the present invention may be implemented with a computer system, systems configured in electronic circuitry and components, an integrated circuit (IC) device such as a microcontroller, a field programmable gate array (FPGA), or an application specific IC (ASIC), and/or apparatus that includes one or more of such systems, devices or components. The computer and/or IC may perform, control or execute instructions relating to hash based fuzzy matching processes, such as for searching a media fingerprints database, are described herein. The computer and/or IC may compute, non-parametrically, the weakbits in a media fingerprint codeword FIG. 4 depicts an example computer system platform 400, with which an embodiment of the present invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. Processor 404 may perform one or more digital signal processing (DSP) functions. Additionally or alternatively, DSP functions may be performed by another processor or entity (represented herein with processor 404).

Computer system 400 may be coupled via bus 402 to a display 412, such as a liquid crystal display (LCD), cathode ray tube (CRT), plasma display or the like, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Embodiments of the invention relate to the use of computer system 400 for hash based fuzzy matching processes, such as for searching a media fingerprints database. An embodiment of the present invention relates to the use of computer system 400 to compute, non-parametrically, weakbits in a media fingerprint codeword. According to an embodiment of the invention, hash based fuzzy matching processes, searching a media fingerprints database, and/or computing, non-parametrically, the weakbits in a media fingerprint codeword are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The terms "computer-readable medium" and/or "computer-readable storage medium" as used herein may refer to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and other conductors and fiber optics, including the wires that comprise bus 402. Transmission media can also take the form of acoustic or electromagnetic (e.g., light) waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a digital subscriber line (DSL), cable or other modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for implementing one or more of hash based fuzzy matching processes, searching a media fingerprints databases, and/or non-parametrically computing weakbits in a media fingerprint codeword.

The received code may be executed by processor 404 as it is received, and/or stored in storage device 410, or other non-volatile storage for later execution. In this manner, computer system 400 may obtain application code in the form of a carrier wave.

Example IC Platform

Figure 5:
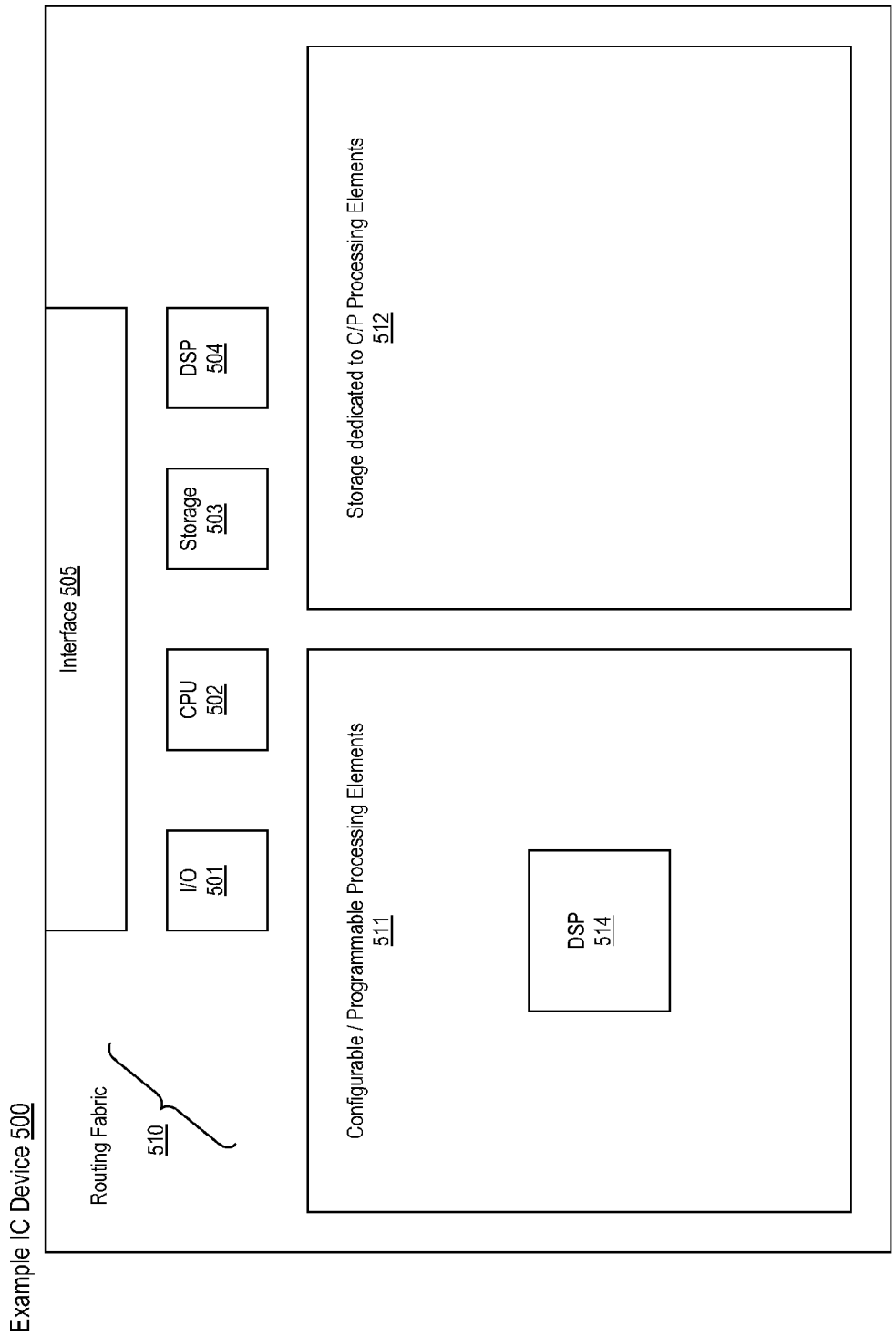
FIG. 5 depicts an example IC platform, with which embodiments of the invention may be implemented.

FIG. 5 depicts an example IC device 500, with which an embodiment of the present invention may be implemented, e.g., for one or more of hash based fuzzy matching processes, searching a media fingerprints databases, and/or non-parametrically computing weakbits in a media fingerprint codeword. IC device 500 may have an input/output (I/O) feature 501. I/O feature 501 receives input signals and routes them via routing fabric 510 to a central processing unit (CPU) 502, which functions with storage 503. I/O feature 501 also receives output signals from other component features of IC device 500 and may control a part of the signal flow over routing fabric 510. A digital signal processing (DSP) feature performs at least function relating to discrete time signal processing. An interface 505 accesses external signals and routes them to I/O feature 301, and allows IC device 500 to export signals. Routing fabric 510 routes signals and power between the various component features of IC device 500.

Configurable and/or programmable processing elements (CPPE) 511, such as arrays of logic gates may perform dedicated functions of IC device 500, which in an embodiment may relate to extracting and processing media fingerprints that reliably conform to media content. Storage 512 dedicates sufficient memory cells for CPPE 511 to function efficiently. CPPE may include one or more dedicated DSP features 514.

Equivalents, Extensions, Alternatives And Miscellaneous

Example embodiments relating to hash based fuzzy matching processes, searching a media fingerprints databases, and/or non-parametrically computing weakbits in a media fingerprint codeword are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
computing two or more values for a feature in an instance of query content;
comparing each of the two or more computed query feature values to at least one threshold value that corresponds to at least one of the two or more computed query feature values;
based on the comparisons, determining at least a first bit and a second bit in a hash value that is derived from the query content feature;
computing a first conditional probability value for the likelihood that a quantized bit value of the first query feature value equals a quantized bit value of a target or a reference feature value;
computing a second conditional probability value for the likelihood that a quantized bit value of the second query feature value equals a quantized bit value of a target or reference feature value;
comparing the computed first conditional probability value and second conditional probability value;

based on the comparison, determining a relative strength of the first bit and the second bit, wherein the relative bit strength directly corresponds to the computed conditional probability;

selecting the first bit as a weakbit if its bit strength is lower than that of the second bit; or selecting the second bit as the weakbit if its bit strength is lower than that of the first bit;

toggling the value of the weakbit, wherein a variation of the hash value, which is derived from the query content feature, is generated; and extending the query using the generated hash value variation.

2. The method as recited in claim 1 wherein the conditional probability value is computed based on:

a difference between the feature value and the threshold value; and a robustness characteristic of the feature, wherein the feature robustness characteristic relates to the difference between the feature value and the threshold value.

3. The method as recited in claim 1 wherein the query feature is determined from a sample of at least a portion of the media content at one or more of playout time, upload time or streaming time.

4. The method as recited in claim 3 wherein the robustness characteristic is determined prior to computing the query feature value from the off-line training set.

5. The method as recited in claim 2 wherein the robustness characteristic of the feature is determined independently in relation to the query feature value.

6. The method as recited in claim 2 wherein the robustness characteristic of the feature is determined, at least in part, in relation to the query feature value.

7. The method as recited in claim 2, further comprising:

computing one or more original or reference feature values that are based on the feature in an original or a reference instance of the media content;

modifying the content, wherein a modified instance of the content is formed;

computing one or more modified feature values that are based on the feature in a the modified content instance; and computing a difference between the original or the reference feature values and the modified feature values;

wherein the robustness characteristic relates to the computed difference.

8. The method as recited in claim 7 wherein the modification comprises changing the original or the reference content in one or more particular respects, wherein the robustness characteristic relates to the one or more particular respects.

9. The method as recited in claim 7 wherein the robustness characteristic comprises a cumulative distribution that is based on one or more of:

the computed difference; or the modified feature values.

10. The method as recited in claim 2, further comprising:

computing one or more original or reference feature values that are based on the feature in an original or a reference instance of the media content;

modifying the content, wherein a modified instance of the content is formed;

computing one or more modified feature values that are based on the feature in a the modified content instance; and identifying a particular feature value that is based on the feature in a portion of the original or the reference content, which is at least similar to the feature value that is computed based on the query content instance;

wherein a measurement of the robustness characteristic is based on at least one of the original content instance or the modified content instance.

11. The method as recited in claim 7 wherein the modification comprises one or more of:

a camcorder capture of the original or reference content;

an aspect ratio change to the original or reference content;

one or more of intensity or color related changes to the original or the reference content;

one or more of rotation, translation, affine motion, warping or geometric modification of the original or reference content; or an off-speed playout or an upload of the original or reference content.

12. The method as recited in claim 2 wherein, upon comparing the feature value to the threshold value, it is determined that the feature value exceeds the threshold value, the method further comprising:

applying a measurement of the robustness characteristic to the feature value based on the feature in the query content;

computing a distribution associated with the feature value, wherein a first portion of the computed distribution is less than the threshold value and wherein a second portion of the computed distribution is greater than the threshold value; and determining the bit strength based on the computed distribution.

13. The method as recited in claim 2 wherein, upon comparing the feature value to the threshold value, it is determined that the feature value is less than the threshold value, the method further comprising:

applying a measurement of the robustness characteristic to the feature value based on the feature in the query content;

computing a distribution associated with the feature value; and determining the bit strength based on the computed distribution.

14. The method as recited in claim 2 wherein a measurement of the robustness characteristic relates to one or more of:

a plurality of difference ranges that are associated with feature value; or a probability that is associated with at least one of the feature value difference ranges.

15. The method as recited in claim 1 wherein the bit is selected as a weak bit based on its strength in relation to the strength of at least one other of the bits.

16. The method as recited in claim 1, further comprising determining that the query content that is associated with the hash value, which is derived from the query content feature, is at least similar to the target original content or the reference content that is associated with the corresponding target hash value.

17. The method as recited in claim 1 wherein the determination of the relative strength of the first bit and the second bit comprises evaluating a cumulative distribution function based on a difference between the feature value and the threshold value.

18. The method as recited in claim 1 wherein the determination of the relative strength of the first bit and the second bit comprises evaluating a cumulative distribution function based on the feature value and a difference between the feature value and the threshold value.

19. The method as recited in claim 18 wherein the cumulative distribution function is computed based on a plurality of the difference values.

20. The method as recited in claim 1 wherein, in relation to the computation of the first conditional probability value for the likelihood that the quantized bit value of the first query feature value equals the quantized bit value of a target or a reference feature value, the reference feature comprises a feature from an instance of reference content, which corresponds to the query content feature in relation to a bit position that is associated with the query content instance and a corresponding bit position that is associated with the reference content instance.

21. The method as recited in claim 1 wherein, in relation to the computation of the second conditional probability value for the likelihood that the quantized bit value of the second query feature value equals the quantized bit value of a target or a reference feature value, the reference feature comprises a feature from an instance of reference content, which corresponds to the query content feature in relation to a bit position that is associated with the query content instance and a corresponding bit position that is associated with the reference content instance.

22. A non-transitory computed readable storage medium comprising instructions that are encoded tangibly therewith, which when executed by one or more processors, cause or control the processors to perform, execute or control a method, wherein the method comprises the steps of:
  computing two or more values for a feature in an instance of query content;
  comparing each of the two or more computed query feature values to at least one threshold value that corresponds to at least one of the two or more computed query feature values;
  based on the comparisons, determining at least a first bit and a second bit in a hash value that is derived from the query content feature;
  computing a first conditional probability value for the likelihood that a quantized bit value of the first query feature value equals a quantized bit value of a target or reference feature value;
  computing a second conditional probability value for the likelihood that a quantized bit value of the second query feature value equals a quantized bit value of a target or a reference feature value;
  comparing the computed first conditional probability value and second conditional probability value;
  based on the comparison, determining a relative strength of the first bit and the second bit, wherein the relative bit strength directly corresponds to the computed conditional probability;
  selecting the first bit as a weakbit if its bit strength is lower than that of the second bit; or
  selecting the second bit as the weakbit if its bit strength is lower than that of the first bit;
  toggling the value of the weakbit, wherein a variation of the hash value, which is derived from the query content feature, is generated; and
  extending the query using the generated query hash value variation.

23. A system, comprising:
  means for computing two or more values for a feature in an instance of query content;
  first comparison means for comparing each of the two or more computed query feature values to at least one threshold value that corresponds to at least one of the two or more computed query feature values;
  means for determining, based on a function of the comparison means, at least a first bit and a second bit in a hash value that is derived from the query content feature;
  means for computing a first conditional probability value for the likelihood that a quantized bit value of the first query feature value equals a quantized bit value of a target or a reference feature value;
  means for computing a second conditional probability value for the likelihood that a quantized bit value of the second query feature value equals a quantized bit value of a target or a reference feature value;
  second comparison means for comparing the computed first conditional probability value and second conditional probability value;
  means for determining, based on a function of the second comparison means, a relative strength of the first bit and the second bit, wherein the relative bit strength directly corresponds to the computed conditional probability;
  means for selecting the first bit as a weakbit if its bit strength is lower than that of the second bit;
  means for selecting the second bit as the weakbit if its bit strength is lower than that of the first bit;
  means for toggling the value of the weakbit, wherein a variation of the hash value, which is derived from the query content feature, is generated; and
  means for extending the query using the generated query hash value variation.

24. An apparatus, comprising:
  at least one processor; and
  a non-transitory computed readable storage medium comprising encoded instructions, which when executed by one or more processors, cause or control the processors to perform, execute or control a method, wherein the method comprises the steps of:
  computing two or more values for a feature in an instance of query content;
  comparing each of the two or more computed query feature values to at least one threshold value that corresponds to at least two of the one or more computed query feature values;
  based on the comparisons, determining at least a first bit and a second bit in a hash value that is derived from the query content feature;
  computing a first conditional probability value for the likelihood that a quantized bit value of the first query feature value equals a quantized bit value of a target or a reference feature value;
  computing a second conditional probability value for the likelihood that a quantized bit value of the second query feature value equals a quantized bit value of a target or reference feature value;
  comparing the computed first conditional probability value and second conditional probability value;
  based on the comparison, determining a relative strength of the first bit and the second bit, wherein the relative bit strength directly corresponds to the computed conditional probability;
  selecting the first bit as a weakbit if its bit strength is lower than that of the second bit; or
  selecting the second bit as the weakbit if its bit strength is lower than that of the first bit;
  toggling the value of the weakbit, wherein a variation of the hash value, which is derived from the query content feature, is generated; and
  extending the query using the generated query hash value variation.

25. An integrated circuit (IC) device that is configured, programmed or controlled to perform a method, wherein the method comprises the steps of:
   computing two or more values for a feature in an instance of query content;
   comparing each of the two or more computed query feature values to at least one threshold value that corresponds to at least two of the one or more computed query feature values;
   based on the comparisons, determining at least a first bit and a second bit in a hash value that is derived from the query content feature;
   computing a first conditional probability value for the likelihood that a quantized bit value of the first query feature value equals a quantized bit value of a target or a reference feature value;
   computing a second conditional probability value for the likelihood that a quantized bit value of the second query feature value equals a quantized bit value of a target or reference feature value;
   comparing the computed first conditional probability value and second conditional probability value;
   based on the comparison, determining a relative strength of the first bit and the second bit, wherein the relative bit strength directly corresponds to the computed conditional probability;
   selecting the first bit as a weakbit if its bit strength is lower than that of the second bit; or
   selecting the second bit as the weakbit if its bit strength is lower than that of the first bit;
   toggling the value of the weakbit, wherein a variation of the hash value, which is derived from the query content feature, is generated; and
   extending the query using the generated query hash value variation.

26. The IC device as recited in claim 25 wherein the IC device comprises at least one of: a microprocessor, a programmable logic device (PLD), a field programmable gate array (FPGA), a digital signal processor (DSP), a microcontroller or an application specific IC (ASIC).

* * * * *